Figure 1:
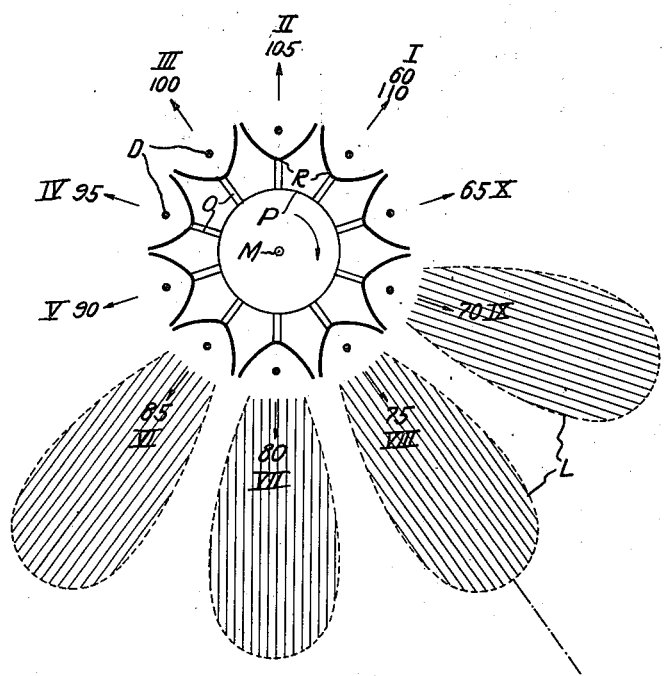

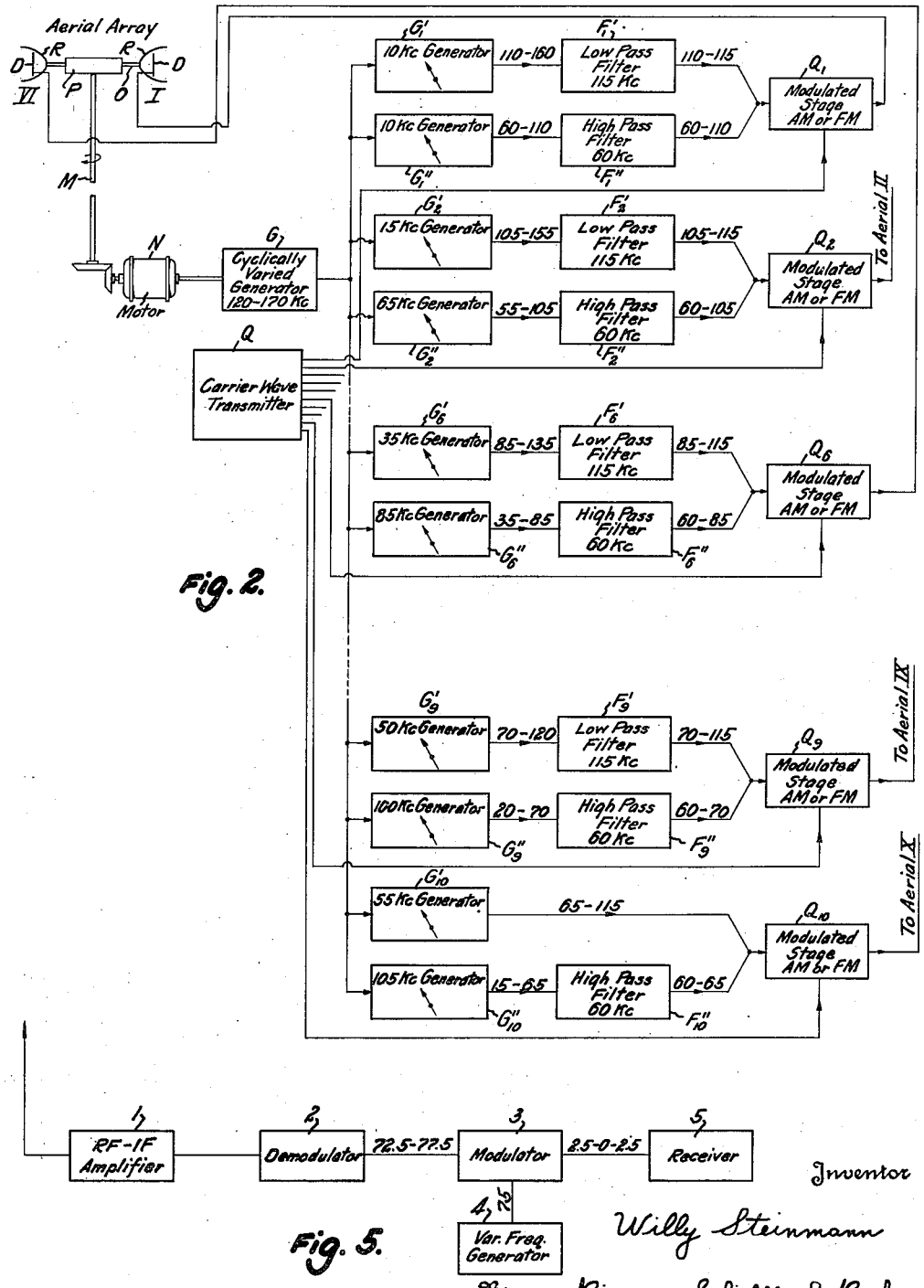

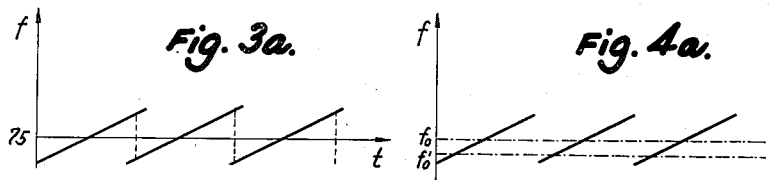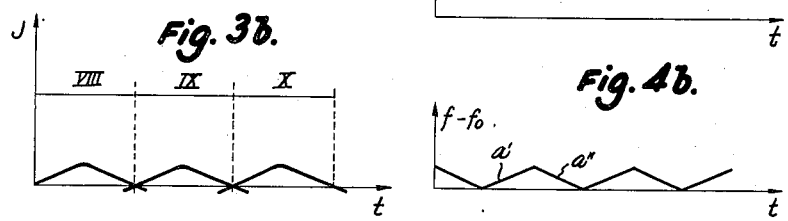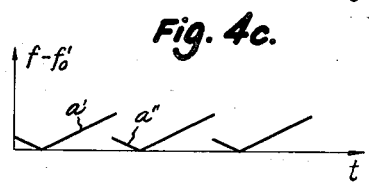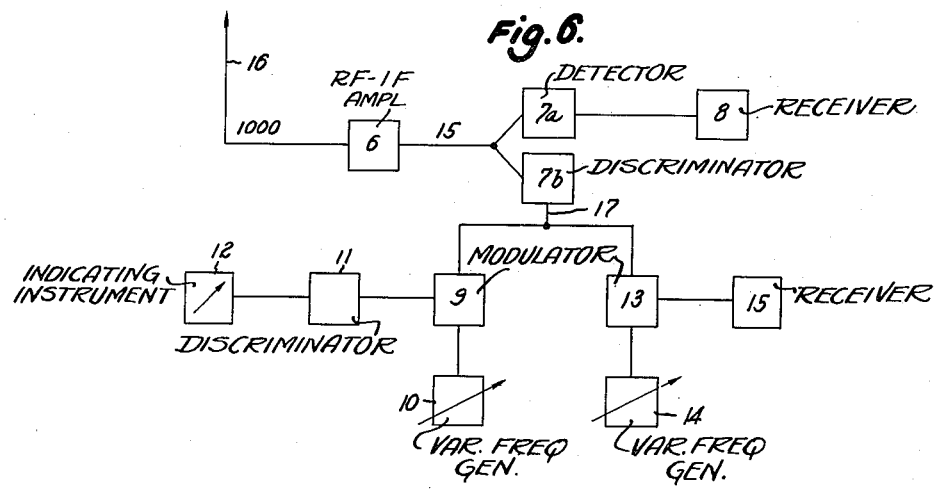

Patented Feb. 8, 1949

2,461,187

UNITED STATES PATENT OFFICE 2,461,187

DIRECTION FINDING APPARATUS

Willy Steinmann, Zurich-Wipkingen, Switzerland, assignor to Patelhold Patenlverwertungs- & Elektro-Holding A.-G., Glarus, Switzerland Application May 4, 1945, Serial No. 591,889
In Switzerland May 6, 1944

30 Claims. (Cl. 343—106)

The radio location of aircraft is known to possess a number of disadvantages. It requires a comparatively large number of direction finder ground stations and this increases the costs of operation. Only a limited number of aircraft can be directed at the same time, because generally two ground stations are necessary for directing the aircraft. The duration of the measurement is relatively long because the result has to be communicated to the aircraft. Despite the introduction of impulse direction finding, it is impossible to eliminate the night effect completely, so that errors are always possible and these may cause accidents.

Furthermore it is also known to provide large aircraft with their own direction finders which enable the crew to obtain their bearings from ground transmitters. Such sets are, however, large and heavy, the frame aerial causes a loss of power due to its air resistance, and furthermore in many cases the direction findings are useless due to the night effect. If special radio beacons are used as ground stations a large amount of wave space is required and this often disturbs radio broadcasting and other services.

The present invention concerns a method of determining the angle of a receiver with reference to a radio beacon by means of the direction finding signal radiated by this radio beacon, the aforementioned disadvantages being avoided by several beams radiated from one point being used as the radio beacon, these beams rotating about a common axis and consisting of electromagnetic oscillations of not more than several metres wave length, a value for indicating or identifying the angle being impressed on these oscillations and varying continuously during rotation, whereby the beams in the same angular position have the same identifying value. The device for performing this method is characterised by several directional aerials rotating about a common axis and radiating electromagnetic oscillations not exceeding a few metres wave length, an angle identifying value being applied the radiated waves which varies continuously during rotation, those beams which are in the same angular position having the same identifying value.

Compared with known methods the method according to the invention possesses several advantages. In the first place the receiving apparatus is very simple. A receiver for high frequency waves which already exists in the aircraft can be used for this purpose, such a receiver being provided with additional devices if necessary. According to the invention readings can be taken very quickly because the time taken to receive a high frequency signal is not short when compared with the time during which no signal is received, such as is for instance the case if a single guide beam rotates. The received signal is clear and enables an accurate reading to be obtained because by using electromagnetic waves in the ultra-short range or micro waves it is possible to obtain a strong concentration of the beams in addition to other advantages. On account of the small angular deviation between neighbouring beams the secondary maxima, which in certain cases may be the cause of faulty measurements, are made to overlap. Furthermore the bearing does not have to be corrected with a direction-finding error chart. The bearing can also easily be kept secret if the angle identifying value is varied according to a definite plan. Finally this new method can also be used for blind landings.

Figure 7:
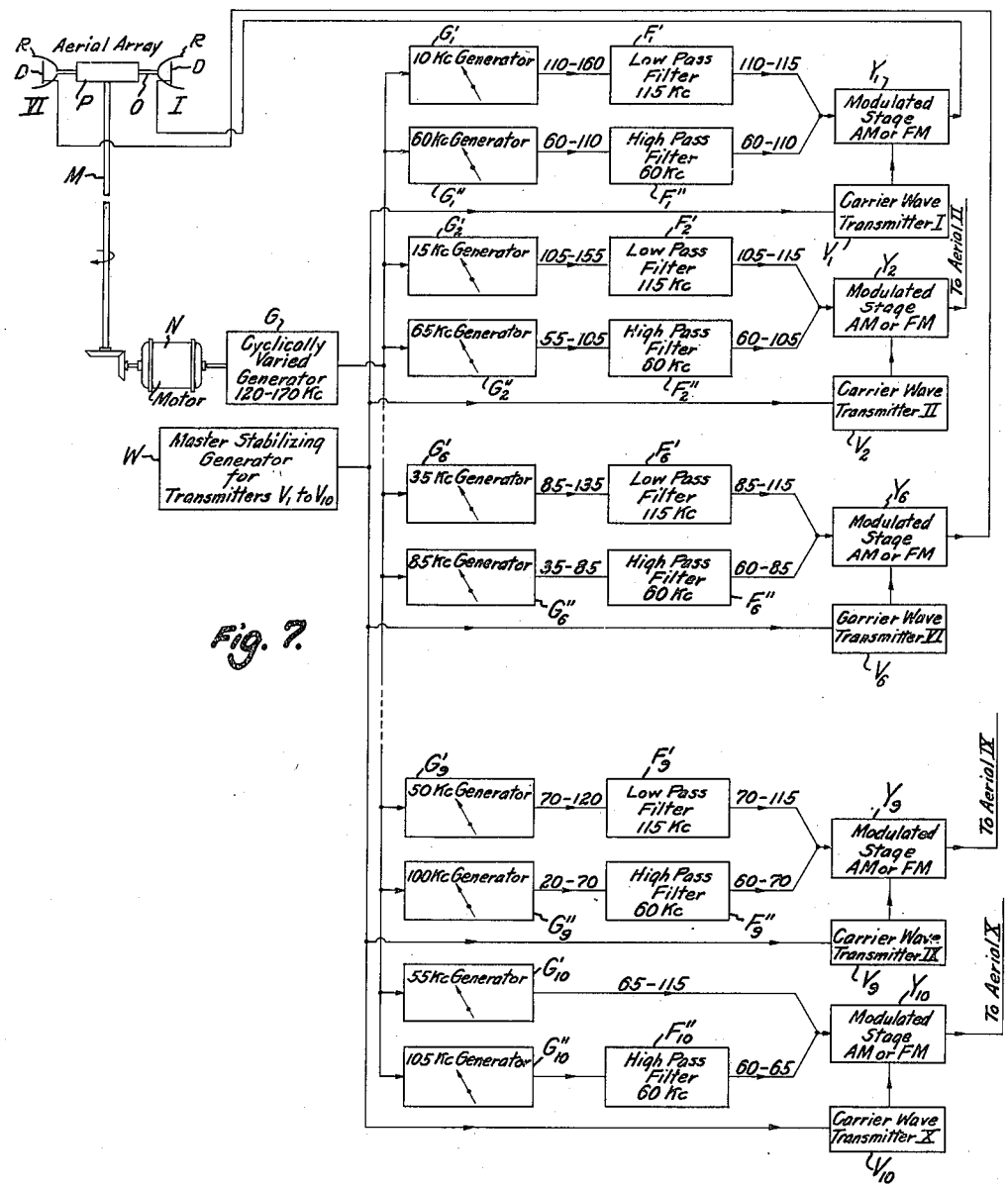

The method according to the invention is now explained by means of the accompanying drawings in which Fig. 1 shows a radio beacon plant in diagrammatic manner; Fig. 2 is a schematic diagram which serves to explain the manner of deriving angle identifying values radiated by the beacon shown in Fig. 1; Figs. 3 and 4 illustrate the operation of the receivers; Figs. 5 and 6 are diagrammatic representations of such apparatus; and Fig. 7 is a schematic diagram illustrating a modified transmitter arrangement for radiating the signal pattern.

In the radio beacon plant represented in Fig. 1, a circular array of like and equally spaced directional aerials I—X is utilized. Each aerial consists of a di-pole D located within a reflector R, and the directional pattern of the beam radiated by each aerial is designated by the dotted curve L. E indicates the position of a receiver which by receiving the bearing signal radiated by the beacon determines its angular position with reference to this beacon. For this purpose the bearing signals possess an angle identifying value. In the constructional example under consideration this identifying value is formed by an auxiliary frequency. As shown in Figure 1 this auxiliary frequency amounts to 65 kilo-cycles at aerial X, 70 kilocycles at aerial IX, and so on, for the indicated position of the radio beam. Aerial I when in the position shown in Fig. 1 radiates simultaneously two different frequencies, namely 60 and 110 kilocycles. This double radiation occurs until the such aerial has moved into the position shown occupied by aerial X and then amounts to 65 and 115 kilocycles. By this means accurate direction finding is possible also at the transition points between the high and low frequencies. Each aerial possesses the same angle identifying frequency in the same angular position so that a receiver, for instance at position E, by determining the frequency received by it can find out its bearing with reference to the beacon, because there is a definite relationship between the frequency and the bearing.

Fig. 2 illustrates in diagrammatic form one suitable arrangement for rotating the aerial array R—D and producing the angle identifying indicia which are radiated from the several di-poles D. Here it is seen that a motor drive N is used for rotating the aerial array about the axis M. All of the di-poles D and their associated reflectors R are secured at the outer end of spokes O extending radially from a hub P rotatable about shaft or axis M as shown in Fig. 1 so that the entire aerial array turns as a single structural unit. In this apparatus G is a generator for producing periodically variable frequencies with a steady course within the range of 120–170 kilocycles. Generator G is coupled to motor N for control by the latter in such manner as will vary its output frequency uniformly in timed relation with rotation of the aerial array, the frequency varying from 120 to 170 kilocycles for each complete revolution of the aerial array. $G_1'$, $G_2'$ ... $G_{10}'$ indicate generators for the constant frequencies 10, 15 ... 55 kilocycles with modulators; $G_1''$, $G_2''$ ... $G_{10}''$ are generators for the frequencies 60, 65 ... 105 kilocycles with modulators; $F_1'$ ... $F_9'$ are low-pass filters with a limiting frequency of 115 kilocycles. $F_1''$ ... $F_{10}''$ are high-pass filters with a limiting frequency of 60 kilocycles. If the electrical oscillations of variable frequency of generator G are superposed on the constant frequency oscillations of generators G' and G'', then for instance at the position shown occupied by aerial I rhythmically pulsating modulation frequencies between the limits 110 ... 160 and 60 ... 110 kilocycles will occur. Oscillations with frequencies 110 ... 115 and 60 ... 110 kilocycles will then be allowed to pass through the filters $F_1'$ and $F_1''$. The modulation frequencies transmitted at the positions shown occupied by the other aerials II to X and allowed to pass are shown in Fig. 2. The manner in which these occur is quite clear and does not require further explanation.

In the Fig. 2 arrangement, a common transmitter unit Q is used as the source of the carrier wave impressed upon all of the aerials and it is accordingly provided with as many separate output channels and modulating stages $Q_1$—$Q_{10}$ as there are aerials. The modulating stages may be for either amplitude modulation (AM) or frequency modulation (FM) as desired. The respective outputs from the modulating stages $Q_1$—$Q_{10}$ are passed to aerials I—X, respectively. Fig. 2 shows schematically only those connections between modulating stages $Q_1$, $Q_6$ and aerials I and VI, but it will be understood that the remaining modulators are similarly connected to their associated aerials as indicated by the legends placed on the drawing.

When care is taken that the period of the frequency change of generator G coincides with a period of a mechanical rotation of the array of directional aerials I—X (Fig. 1) and the latter are distributed uniformly around the circumference, then all aerials transmit the same modulating frequencies at the same angle. These modulating frequencies are radiated by being superposed on a carrier wave of the ultra-short or micro-wave range so that the radiated oscillations can be concentrated by directional aerials of not too large a size. By this means directed bearing signals are obtained which possess an identifying value which is a function of the angle.

With a special constructional form of apparatus according to the invention a better utilization of the transmitter with amplitude modulation and single side band transmission is obtained when the carrier is radiated without being directed and only the side band is directed. It is particularly advantageous to modulate the carrier frequency, which is already provided with an angle identifying value, with an additional frequency band; at the same time it is advisable to maintain the modulation depth due to the latter smaller than that corresponding to the angle identifying value. The additional frequency band can for instance serve to transmit information such as weather reports simultaneously with the direction finding signal. It is possible for this purpose to modulate once more the amplitude-modulated signal with another frequency either, as regards amplitude or frequency, or a frequency-modulated signal can be given an additional amplitude modulation.

According to these modulation methods an impulse for indicating a change in the angle identifying value can also be radiated, if it is desired to keep the direction finding secret. Such secrecy can be achieved for instance if the angle associated with the extreme values of the angle identification are varied according to a fixed plan.

Since after the directional aerials I—X have been installed it may happen that deviations occur from the prescribed directions of the beam characteristics, the fixed frequencies of generators $G_1'$—$G_{10}'$ and $G_1''$—$G_{10}''$ associated with the aerials are made adjustable so as to enable a correction to be made. Such adjustability is indicated on the drawing by the inclusion of a conventional arrow symbol within each of the rectangles used to denote the generators.

If it is only desired to provide direction finding in a certain region or if the radiation of direction finding signals is for certain reasons useless in certain directions, then the aerials only need to radiate signals over part of the circumference. Depending upon the magnitude of the sector it may be more expedient to impart a reciprocating instead of a rotating motion to the aerials, whereby costs are reduced, because the aerials only have to radiate over a sector.

In order to avoid sliding contacts it is an advantage if the transmitting set and the directional aerials are rigidly coupled together, that is to say the complete radio beacon plant is mounted on the same rotating body.

In order to produce an angle identifying value for the arrangement shown in Fig. 1 each aerial can be provided with a special transmitter having a variable frequency, the carrier frequency of these transmitters being maintained constant by means of a common standard generator of slightly different frequency. For this purpose the difference oscillations of the standard oscillator and the transmitter oscillator are for instance applied to a discriminator which produces the regulating value required for control purposes. The general arrangement contemplated is shown in Fig. 7. Here each of the transmitting aerials I—X is served by a separate carrier wave generator $V_1$—$V_{10}$, the frequencies of which are stabilized by a master generator W. As in the Fig. 2 arrangement, modulation stages $Y_1$—$Y_{10}$ either AM or FM are provided to modulate the respective carrier wave outputs of generators $V_1$—$V_{10}$ with the outputs from the fixed frequency generators $G_1'$—$G_{10}'$ and $G_1''$—$G_{10}''$ that are passed by the high and low pass filters $F_1'$—$F_{10}'$ and $F_1''$—$F_{10}''$.

If an aircraft or vehicle wishes to obtain its bearings it is sufficient if the angular position relative to two radio beacons whose locations are known, is determined. An important advantage of the method according to the invention is that the bearing can be obtained with any high frequency receiver. When direction finding signals are received by the receiver, due to the concentration of the radiated waves not being perfectly sharp a short characteristic signal of 75 kilocycles is not received at a definite instant as would be the case in Fig. 1 for the indicated position of E, but a direction finding signal is received somewhat before and after the passage of the beam maximum. The receiver thus receives a very weak signal of for instance 73 kilocycles which rapidly becomes stronger and reaches its maximum value at 75 kilocycles, whereupon it immediately becomes weaker and for instance disappears again at 77 kilocycles. The same process repeats itself during the passage of aerial IX, and also aerial X, and so on, as is shown graphically in Fig. 3. Fig. 3a shows the course of the frequency $f$ for the angle identification of the bearing signal, whilst Fig. 3b shows the course of the intensity $J$ of the received signal as a function of the time $t$. The range VIII indicates the time during which bearing signals radiated by aerial VIII are received, whilst range IX refers to the time during which signals radiated by aerial IX are received, and so on.

In order to determine the direction it is necessary to ascertain which frequency corresponds to the maximum amplitude of the received signal. For accurate measurements it is of course not expedient to use just any standard receiver, but to provide a set especially designed for the reception of direction finding signals. This set is preferably made so that it can also be used for the reception of standard high frequency waves.

With one form of apparatus for receiving angle identifying values in the form of variable frequencies, the signal forming the angle identifying value is first of all obtained from the received high frequency and has a course such as is shown in Fig. 3a or 4a. By superposing a frequency $f_0$ which is equal to the average value of the angle identifying signal, an auxiliary oscillation as shown in Fig. 4b is obtained. If this auxiliary frequency does not coincide with the average frequency, as in the case with the frequency $f_0'$, then the low frequency modulation product thus formed follows a course as shown in Fig. 4c. By listening to these oscillations within the range of audibility it is possible by making use of the rhythm to decide if the frequency of the auxiliary oscillation coincides with the average angle identifying frequency to be determined, because the modulation product must follow a purely symmetrical course if the tuning is correct. For tuning purposes use is made of the symmetry of the modulation product which exists when the tuning is correct; that is to say tuning is achieved by those values of the low frequency direction finding signal which are equally distant from the actual angle identifying value being adjusted to the same magnitude. When tuning has been completed the heterodyne frequency is identical with that of the angle identifying value which is being sought.

In order to control the adjustment of the heterodyne frequency $f_0$ the course of the modulation product can also be controlled by optical instead of acoustical means. For this purpose the difference frequency obtained from the characteristic signal and the heterodyne frequency is supplied to a resistance-capacitive (so-called RC element) after which when rectified a frequency-proportional direct voltage occurs, which is for instance applied to the $y$ plates of a cathode ray oscillograph. The two straight lines $a'$ and $a''$ (Figs. 4b and 4c) then occur on the screen if there is a time deviation in the $x$-direction, these lines having to be adjusted to the same height or brought into symmetry by varying the frequency of the auxiliary oscillation $f_0$.

A simple device which gives the average value of the angle identifying frequency directly consists of an RC element from whose resistance R a frequency dependent alternating voltage is taken and supplied to an indicating instrument with strong damping. The indicated voltage is thus the average frequency of the alternating voltage at the RC element.

In order to avoid as far as possible that direction finding signals from neighbouring transmitters of a radio beacon appear simultaneously in the receiver the following measures can be adopted. On the one hand care must be taken that by correctly dimensioning the aerials of the transmitters the main characteristics of neighbouring transmitters do not overlap, whilst on the other hand a limiter can be provided whereby when two different signals are received simultaneously the weaker one is suppressed.

Fig. 5 shows diagrammatically a receiving arrangement for frequency or amplitude-modulated bearing signals. In this arrangement 1 indicates the high and intermediate frequency part. After this part there is a demodulator 2 in which the signal for identifying the angle is received. This signal is received with appreciable intensity in the frequency range 72.5–77.5 kilocycles (position of receiver E according to Fig. 1) and is superposed in modulator 3 together with the 75 kilocycle auxiliary oscillations of the variable oscillator 4, so that at the output end of modulator 3 there is a rhythmically varying low frequency oscillation of the range 2.5–0–2.5 kilocycles which can be heard in the receiver 5. For determining the frequency the frequency of generator 4 can be varied and as already described adjusted in such a manner that the received signal follows a symmetrical frequency curve, for instance as shown in Fig. 4b. Since generator 4 is preferably calibrated in angular degrees the desired direction with reference to the radio beacon can be found immediately from its setting.

Fig. 6 concerns an arrangement for receiving, frequency-modulated bearing signals whose amplitude is modulated by a further signal. The micro-wave range signals received by the aerial 16 first pass to an amplifying apparatus 6 with transposing devices for shifting the high frequency signal in the range of for instance $10^3$ megacycles to an intermediate range of 15 megacycles. By means of a detector device 7a with non-linear characteristic those low frequency signals are formed from these intermediate frequencies which are imposed on the bearing signal as an additional amplitude modulation. They are passed on to the receiver 8.

The elements shown in the lower half of the figure serve to determine the identifying frequency for different angles. The characteristic signal whose frequency lies between the limits of 60 and 115 kilocycles is taken from the electrical oscillations of the intermediate frequency range by means of the limiter and the following discriminator 7b and then shifted in modulator 9 by superposing on it the electrical oscillations of the variable frequency oscillator 10 such that the output voltage of discriminator 11 is zero, this being determined by the measuring instrument 12. If discriminator 11 is for instance tuned to 130 kilocycles and the average characteristic value is at 75 kilocycles then when using the upper side band the frequency of auxiliary generator must be 55 kilocycles. The arrangement according to Fig. 6 also contains a further device for determining the angle identifying frequency; this consists of the elements 13, 14 and 15. In this case the angle identifying frequency which oscillates about 75 kilocycles is modulated with the auxiliary frequencies of generator 14 in modulator 13. The lower side band is now used to indicate the tuning. With this arrangement the auxiliary frequency of oscillator 14 is so selected that it coincides with the average frequency of the oscillating identifying frequency, as was the case in connection with the arrangement of Fig. 5. As a result a signal reaches receiver 15 which lies within the audible range, for instance 0 and 2.5 kilocycles.

I claim:

1. In the art of radio direction finding, the process of establishing a field in space which comprises, propagating a plurality of elongated directional radio frequency beams in different directions from a point of transmission, simultaneously and periodically displacing said beams angularly through a predetermined angle, modulating each of said beams with an individual identifying signal, and simultaneously varying the modulating frequencies of the several beams as they are displaced to develop a field pattern of identifying signals which remains substantially fixed in space during displacement of said beams.

2. In the art of radio direction finding, the process defined in claim 1 characterized by the fact that the radio frequency beams are amplitude modulated.

3. In the art of radio direction finding, the process defined in claim 1 characterized by the fact that the radio frequency beams are frequency modulated.

4. In the art of radio direction finding, the process defined in claim 1 characterized by the fact that the modulation for each beam is produced by superposing a variable frequency with at least one fixed frequency.

5. In the art of radio direction finding, the process of establishing a field in space which comprises propagating an array of elongated directional radio frequency beams in different angular directions from a transmission point, simultaneously and periodically displacing said array of beams angularly through a predetermined angle, impressing an identifying signal on each beam, and simultaneously varying a characteristic of the signal on each beam as the array of beams is displaced to develop a field pattern of identifying signals which remains substantially fixed in space as to signal characteristic during displacement of said array of beams.

6. In the art of radio direction finding, the process defined in claim 5 characterized by the fact that the minimum and maximum values of the pattern of the identifying signals overlap.

7. In the art of radio direction finding, the process defined in claim 5, and further including the steps of receiving one of said beams at a point in space, and ascertaining the characteristic of the angle identifying signal corresponding to such point from the characteristics of neighboring received identifying signals.

8. In the art of radio direction finding, the process as defined in claim 5 and further including the steps of receiving at a point in space remote from the transmission point a band of said signals of varying characteristic, and ascertaining the characteristic of the angle identifying signal corresponding to such point from the rhythmical course of the upper and lower limits of the received band of signals.

9. In the art of radio direction finding, the process defined in claim 5, and further including the steps of receiving at a point in space remote from the transmission point a band of signals of varying characteristic, converting the received signal band into a symmetrical signal, and ascertaining the characteristic of the particular identifying signal corresponding to such point in space from the rhythmical course of the derived symmetrical signal as the latter changes in accordance with changes in the characteristics of the identifying signal over the received band.

10. In the art of radio direction finding, the process defined in claim 5, and further including the steps of receiving at a point in space remote from the transmission point a band of signals of varying characteristic, and converting the received signal band into a symmetrical audible signal having like tones for signal characteristics equally distant on each side of the particular signal characteristic corresponding to said point in space.

11. In the art of radio direction finding, the process defined in claim 5, and further including the steps of receiving at a point in space remote from the transmission point a band of signals of varying characteristic, and converting the received signal band into a corresponding visual signal which varies a like amount to either side of a reference point for corresponding departures in the characteristic of the identifying signal from the particular characteristic which denotes such point in space.

12. In the art of radio direction finding, the process of providing a field pattern in space comprising, establishing an array of directional beams which diverge from a transmission point, displacing said array of beams angularly about the transmission point, modulating each of said beams with an identifying signal as the beam array is displaced and simultaneously varying the modulating frequencies of the several beams progressively to develop a field pattern of identifying signals of progressively increasing frequency which remains substantially fixed in space during displacement of said beams.

13. In the art of radio direction finding, the process of providing a field pattern in space comprising, transmitting an array of radially directed radio frequency beams in angularly spaced relation from a transmission point, simultaneously and periodically displacing said array through a predetermined angle, and impressing a like modulation on each beam which varies continuously and repeatedly in sawtooth fashion through a predetermined range, the modulation of adjacent beams being displaced in frequency to develop a field pattern of identifying modulation signals which remains substantially fixed in space during displacement of said array.

14. In the art of radio direction finding, the process of providing a field pattern in space comprising, transmitting an array of radially directed radio frequency beams in angularly spaced relation from a transmission point, said array extending for substantially 360° in azimuth, rotating said array of beams, and progressively modulating each of said beams between minimum and maximum values once for each 360° displacement of the array of beams, the modulation of adjacent beams being displaced in frequency to develop a field pattern of identifying modulation signals which remains substantially fixed in space during rotation of said beam array.

15. In the art of radio direction finding, the process of providing a field pattern in space comprising, transmitting an array of radially directed radio frequency beams in angularly spaced relation from a transmission point, periodically sweeping said array of beams angularly through a predetermined angle, and progressively modulating each of said beams between minimum and maximum values once for each sweep of said array of beams, the modulation of adjacent beams being displaced in frequency to develop a field pattern of identifying modulation signals which remains substantially fixed in space for each sweep of the array of beams.

16. In the art of radio direction finding, the process of establishing a field pattern in space which comprises, transmitting a plurality of radially directed radio frequency beams in angularly spaced relation with respect to each other, rotating the plurality of beams about the transmission point to produce a plurality of rotating fields, modulating each of said beams with an identifying signal, and simultaneously varying the modulating frequencies of the several beams as the beams rotate to develop a pattern of identifying signals which remains substantially fixed in space during rotation of the beams.

17. In the art of radio direction finding, a radio beacon for setting up a radio frequency field pattern in space comprising a plurality of directional aerials, transmitter means for impressing a radio frequency carrier wave on each aerial, means for displacing said plurality of aerials angularly about a common axis, means for impressing an angle identifying signal on each carrier wave, and means for simultaneously varying a characteristic of the several identifying signals as the aerials are displaced to develop a radio frequency field pattern of angle identifying signals which remains substantially fixed in space as to signal characteristic during displacement of said aerials.

18. A radio direction finder device as defined in claim 17 characterized by the fact that said plurality of aerials are fixed to a common angularly displaceable body.

19. A radio beacon as defined in claim 17 characterized by the fact that said transmitter means comprises a frequency stabilized control oscillator for forming unmodulated radio frequency carrier oscillations, said oscillator being provided with as many parallel supplied amplifier stages as there are aerials, and each of which is connected to one of said aerials.

20. A radio beacon as defined in claim 17 characterized by the fact that said transmitter means comprises a separate transmitter for each aerial, and a frequency stabilized master oscillation generator for stabilizing the carrier waves produced by each of said transmitters.

21. A radio beacon as defined in claim 17 characterized by the fact that adjacent directional aerials produce carrier wave beams having non-overlapping main radiating lobes.

22. A radio beacon as defined in claim 17, in combination with a receiver adapted to be operated at a point in space remote from said beacon, said receiver including means for determining the correct angle identifying signal corresponding to such point in space from neighboring identifying signals.

23. A radio beacon as defined in claim 17, in combination with a receiver adapted to be operated at a point in space remote from said beacon, said receiver including means forming a signal symmetrical with respect to the correct angle identifying signal corresponding to such point in space and by which such correct signal is ascertained.

24. A radio beacon as defined in claim 17, in combination with a receiver adapted to be operated at a point in space remote from said beacon, said receiver including means forming an auxiliary signal symmetrical with respect to the correct angle identifying signal corresponding to such point in space, said auxiliary signal having like characteristics for values of identifying signals which lie equidistant on both sides of the correct value.

25. A radio beacon as defined in claim 17 wherein said transmitter means are frequency modulated to establish the identifying signals, in combination with a receiver adapted to be operated at a point in space remote from said beacon, said receiver including a discriminator to which the incoming signals are applied, an auxiliary oscillator adjustable as to frequency, means forming a modulation product from the respective outputs of said auxiliary oscillator and discriminator, and means deriving the correct identifying signal from said modulation product.

26. In the art of radio direction finding, a radio beacon for setting up a radio frequency field pattern in space comprising, a plurality of directional aerials, transmitter means for impressing a radio frequency carrier wave on each aerial, means for displacing said plurality of aerials angularly about a common axis, means for modulating each of said carrier waves with an identifying signal, and means for simultaneously varying the modulating frequencies of the several carrier waves as the aerials are displaced to develop a field pattern of identifying signals which remains substantially fixed in space during displacement of said aerials.

27. A radio direction finder device as defined in claim 26 wherein the modulating means for each carrier wave comprises at least one fixed frequency oscillator, the several oscillators being stepped in frequency, and the means for varying the modulating frequencies of the several carrier waves comprises a variable frequency oscillator the output of which is superposed upon each of said fixed frequency oscillators to derive modulation products that are impressed respectively on the several carrier waves.

28. In the art of radio direction finding, a radio beacon for setting up in space a substantially fixed radio frequency field pattern of identifying signals of different frequencies comprising, a plurality of directional aerials displaced at equal angles from each other about a common axis, transmitter means for impressing a radio frequency carrier wave on each aerial, means for rotating said aerials about said axis, a fixed frequency modulating oscillator individual to each carrier wave, the frequency of one of said modulating oscillators differing from the frequency of the modulating oscillator associated with the next adjacent carrier wave by $\Delta F/n$, wherein $\Delta F$ is the frequency variation of the identifying signal during one revolution and $n$ the number of aerials, and a variable frequency oscillator the output of which is superposed upon each of said fixed frequency oscillators to derive modulation products of varying frequency that are impressed respectively on the several carrier waves to develop a field pattern of identifying signals which remains substantially fixed in space during rotation of said aerials.

29. A radio beacon as defined in claim 28 and which further includes a second fixed frequency oscillator individual to each carrier wave, said second oscillators being connected in parallel respectively with the other fixed frequency oscillators and differing in frequency therefrom by $\Delta F$.

30. A radio beacon as defined in claim 28 characterized by the fact that the frequency of each fixed frequency oscillator is adjustable.

WILLY STEINMANN.

REFERENCES CITED

The following references are of record in the file of this patent:

UNITED STATES PATENTS

| Number | Name | Date |
| --- | --- | --- |
| 1,820,004 | Kruesi | Aug. 18, 1931 |
| 1,973,296 | Schroter | Sept. 11, 1934 |
| 1,983,079 | Hansen | Dec. 4, 1934 |
| 2,039,812 | Leib et al. | May 5, 1936 |
| 2,063,610 | Linsell | Dec. 8, 1936 |
| 2,257,320 | Williams | Sept. 30, 1941 |
| 2,402,410 | Kear | June 18, 1946 |